United States Patent [19]

Kindersely

[11] Patent Number: 4,688,756

[45] Date of Patent: Aug. 25, 1987

[54] SINGLE SEAT BALL VALVE WITH BAR SPRING BIASING MEMBERS

[76] Inventor: Peter G. Kindersely, 35 Wincrest, Glens Falls, N.Y. 12801

[21] Appl. No.: 809,267

[22] Filed: Dec. 16, 1985

[51] Int. Cl.[4] .............................................. F16K 25/00
[52] U.S. Cl. .................................... 251/183; 251/185; 251/313
[58] Field of Search ............... 251/180, 181, 183, 184, 251/185, 313; 267/158

[56] References Cited

U.S. PATENT DOCUMENTS

| | | | |
|---|---|---|---|
| 2,639,139 | 5/1953 | Carlson | 267/158 |
| 2,672,885 | 3/1954 | Cox | 251/313 X |
| 2,685,427 | 8/1954 | Bugg | 251/185 X |
| 3,591,134 | 7/1971 | Fujiwara | 251/185 X |
| 3,653,406 | 4/1972 | Racki | 251/185 X |
| 4,050,472 | 9/1977 | Sheppard | 251/185 X |
| 4,131,128 | 12/1978 | Götzenberger | 251/185 X |

Primary Examiner—Harold W. Weakley
Attorney, Agent, or Firm—Nixon & Vanderhye

[57] ABSTRACT

A single metal-seated ball valve can accommodate differential temperature expansion of the components without jamming yet provide tight shutoff in a closed position, and provides tight shutoff even if solids are present in the fluid being valved. The valve includes a valve body with a through-extending bore and interior cavity, and a rotatable valve element (such as a ball) having a through-extending passageway and mounted for rotation about an axis for movement between the first, open position in which the passageway and bore are generally aligned, and a second, closed position wherein the passageway and bore are not aligned. A metal sealing ring, or a machined sealing surface of the metal valve body, sealingly engages the valve element and prevents flow of fluid through the bore when the valve element is in its second, closed position. A pair of elongated flexible linear spring elements bias the valve element into sealing relationship with the sealing ring. The elongated spring elements preferably are of metal, and are quadrate or circular in cross-section, and at central portions thereof preferably engage trunions of the valve element. A separate bearing element may be provided at a central portion of one or more spring elements for actually contacting the valve elements. Pins extending from the valve body may have a lost motion connection with the spring elements, and additionally the spring elements may make contact (e.g. tangential line contact) with a shelf portion of the valve body adjacent each pin.

2 Claims, 7 Drawing Figures

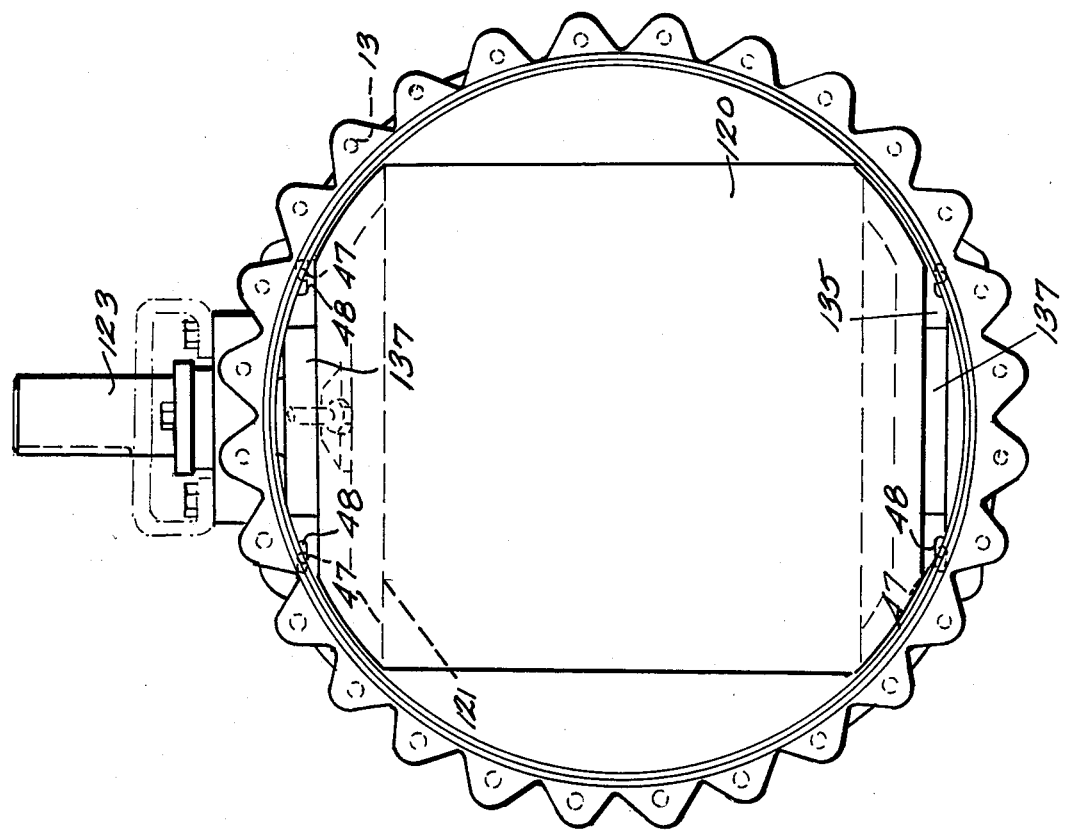
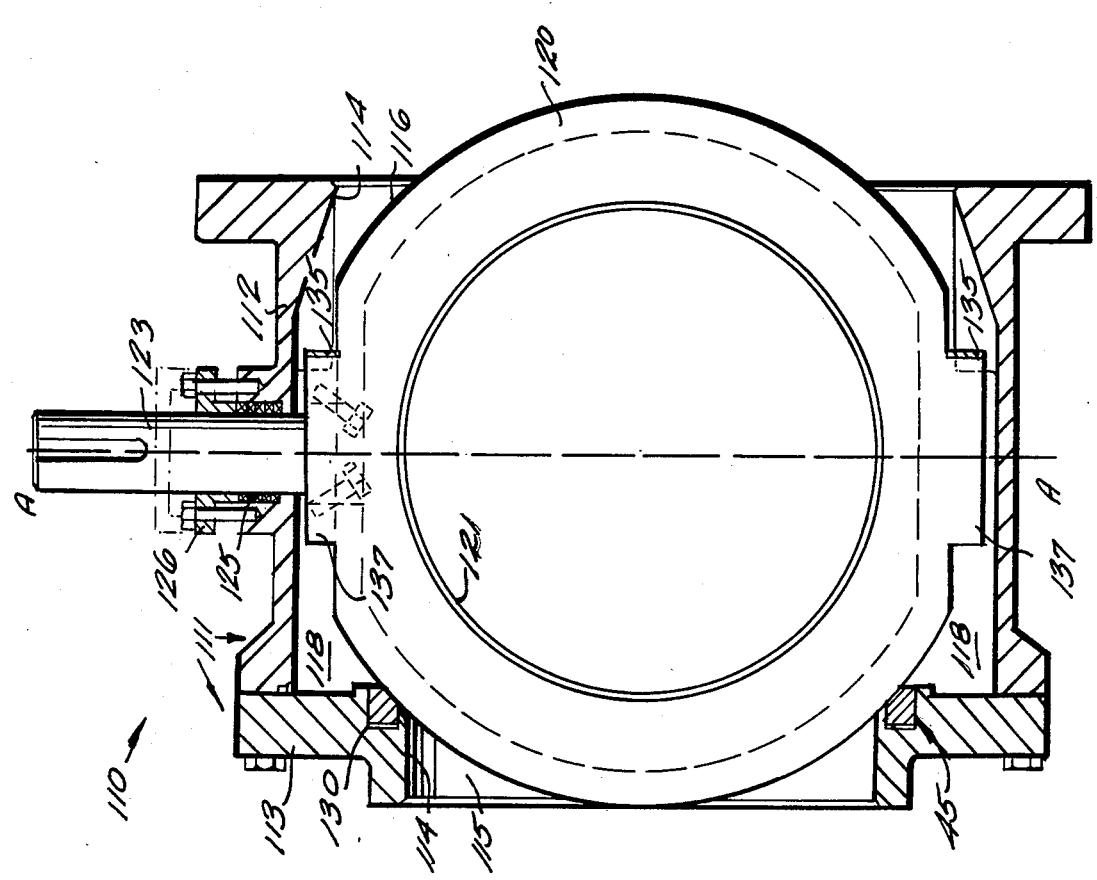

SINGLE SEAT BALL VALVE WITH BAR SPRING BIASING MEMBERS

BACKGROUND AND SUMMARY OF THE INVENTION

In the design of ball valves, or like valves having rotatable valve elements, polymeric or synthetic material valve seats are typically provided. This is due partly to the fact that temperature differences in the valve causes differential thermal expansion of component parts of the valve, which can cause the ball to become enlarged and to jam if the seats are unyielding. Polymeric and synthetic material seats are yielding, whereas metal seats typically are not. Therefore, the design of metal seated ball valves is more complex.

Metal seated ball valves have a number Of advantages over synthetic material seated ball valves, and the like, if the problem of jamming as a result of differential thermal expansion, and related problems, can be avoided. For instance metal seated ball valves are able to much more effectively provide tight shutoff even if solids are present in the fluid being valved. Also, compared to synthetic material-seated valves, metal seated ball valves seldom require replacement or maintenance of the seats.

According to the present invention, a metal seated ball valve, or the like, is provided which can provide tight shutoff in the closed position (even if solids are present in the fluid being valved) without being subjected to jamming due to differential thermal expansion. The valve according to the present invention can provide tight shutoff in both directions, and is simple and inexpensive to construct.

The valve according to the present invention includes as major components thereof a valve body, a rotatable valve element, sealing means, and biasing means.

The valve body preferably is a metal body including means defining a through-extending bore therein (including first and second openings at opposite ends thereof) and an interior cavity.

The rotatable valve element preferably comprises a ball, and has a through-extending passageway therein. It is mounted for rotation about an axis for movement between a first, open position in which the passageway and the bore are generally aligned, to a second, closed position in which the passageway and the bore are not aligned. The ball may include trunions, a shaft, or like components, associated therewith.

The sealing means that are provided are mounted by the valve body adjacent the first end of the body and are for sealingly engaging the valve element and preventing flow of fluids through the bore first end when the valve element is in its second, closed position. The sealing means, or seat, may comprise a detachable metal sealing ring, or it may comprise sealing surface (e.g. a spherical machined surface) of the metal valve body.

The biasing means are particularly suited for effectively, simply, and inexpensively performing their function. The biasing means comprises a pair of elongated flexible linear spring elements spaced from each other along the axis of rotation, and operatively engaging the valve element adjacent the axis of rotation, and operatively engaging the valve body at positions spaced from the axis of rotation, and bias the valve element into sealing relationship with the sealing means. The elongated spring elements preferably comprise metal bars or rods which, at central portions thereof, operatively engage a groove formed in the valve element. A pin may be provided associated with each end of each spring element, each pin extending outwardly from the valve body and having a lost motion connection with the spring element. Additionally, the spring elements may make tangential line contact with a shelf portion of the body adjacent the pins. Further, the spring elements may have a bearing material portion connected at a central portion thereof for actually and operatively engaging the valve element.

It is the primary object of the present invention to provide a simple yet effective metal seated valve with rotatable valve element. This and other objects of the invention will become clear from an inspection of the detailed description of the invention, and from the appended claims.

BRIEF DESCRIPTION OF THE DRAWINGS

FIG. 5 is a view like that of FIG. 1 only showing another exemplary form of the ball valve according to the present invention;

FIG. 6 is an end view of the valve of FIG. 5 with portions cut away for clarity of illustration.

DETAILED DESCRIPTION OF THE DRAWINGS

Figure 1:
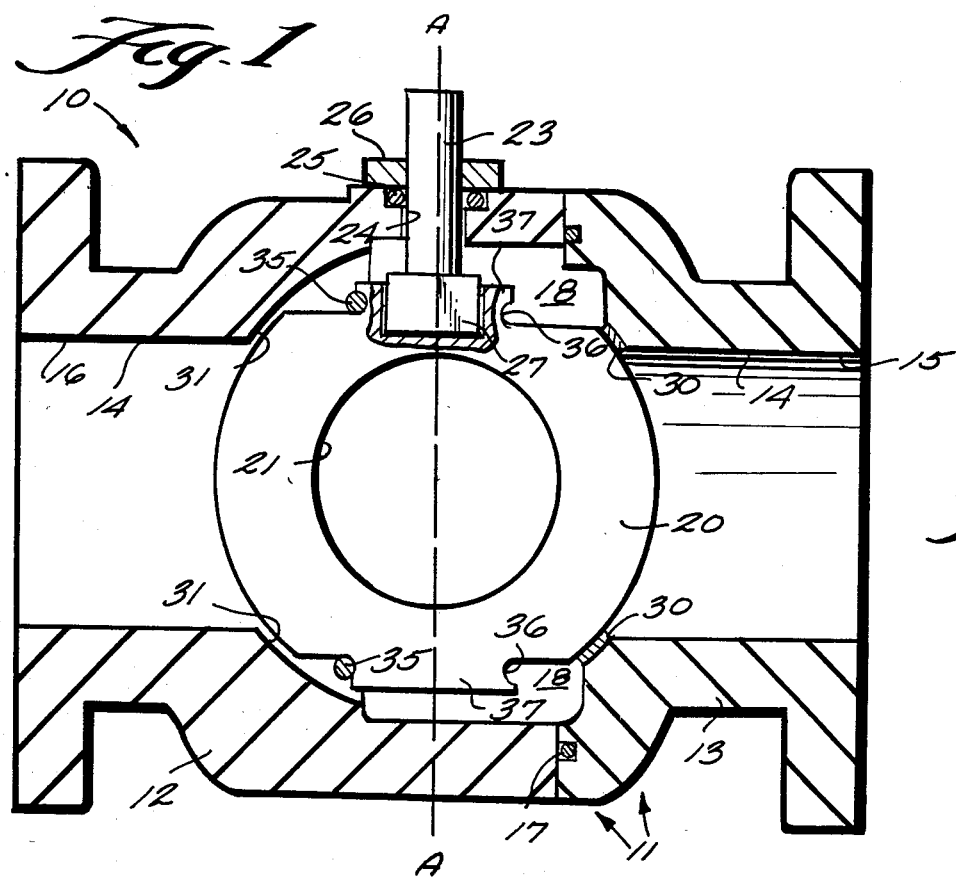
FIG. 1 is a side view, partly in crosssection and partly in elevation, of an exemplary valve according to the present invention.

An exemplary valve according to the present invention is shown generally by reference numeral 10 in FIG. 1. It includes a metal valve body 11, which, in this embodiment, includes a main portion 12 and an end cap 13. Means are provided defining a through-extending bore 14 in the body 11, including first and second openings 15, 16, respectively, at opposite ends thereof. The main portion 12 and end cap 13 maybe held together in any conventional manner (such as by a plurality of fasteners) and preferably an annular sealing element 17 is provided therebetween.

The valve 10 also comprises a rotatable valve element, namely ball 20. The ball 20 includes means defining a through-extending passageway 21 therein. The ball 20 is mounted for rotation about an axis A-A (see FIG. 1) between a first, open position (90° from the position illustrated in FIG. 1) wherein the passageway 21 and the bore 14 are generally aligned, to a second, closed position (illustrated in FIG. 1) wherein the passageway 21 and bore 14 are not aligned, so that fluid to be valved cannot flow from the second end 16 through the first end 15 of the bore 14. The valve element 20 may be mounted for rotation, in part, by a stem or shaft 23 which is received within an opening 24 provided at the top of the valve body 11, with seal 25 and cap 26.

The stem 23 may have a square end 27 which engages a correspondingly shaped opening 28 (see FIG. 2) in the valve element 20 so that rotation of the stem 23 effects rotation of the valve element 20. The valve element 20 is also mounted for rotation by sealing means and biasing means to be hereafter described.

The valve 10 also comprises sealing means mounted by the valve body 11, adjacent the first end 15 of the body 11, for sealingly engaging the valve element 20 and preventing flow of fluid through the bore 14 first end 15 when the valve element 20 is in the second, closed position (position of FIG. 1). In the embodiment illustrated in FIG. 1, the sealing means comprises a spherical surface 30 of the valve body 11, which has been machined, or otherwise formed, in the metal body 11 surrounding the passageway 14. A similar machined sealing spherical surface 31 may also be provided at the opposite end of the interior cavity 18 between the first and second ends 15, 16 of the bore 14.

The valve 10 further comprises biasing means for biasing the valve element 20 into sealing relationship with the sealing means 30. The biasing means according to the invention comprises a pair of elongated flexible linear spring elements 35. The elements 35 are spaced from each other along the axis A-A and operatively engage the valve element 20 adjacent the axis of rotation A-A and engage the valve body 11 at positions spaced from the axis A-A. In the embodiment illustrated in FIGS. 1 and 2, the bar springs 35 fit into grooves 36 in end stub trunions 37. Note the ends of the top bar spring 35 in FIG. 2 make tangential line contact with the notched shelf portions 38 of a part of the valve body 11 defining the interior cavity 18.

Figure 4:
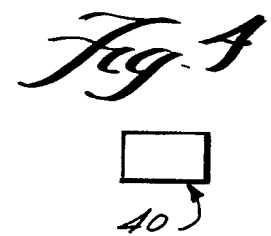
FIG. 4 is an end view of an exemplary spring biasing element according to the present invention.
Figure 3:
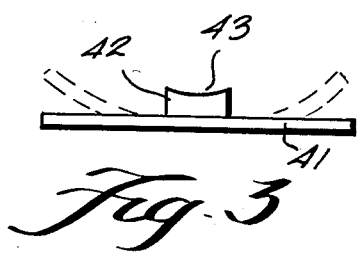
FIG. 3 is a top view of an alternative construction of a spring biasing element utilizable in the practice of the invention.
Figure 2:
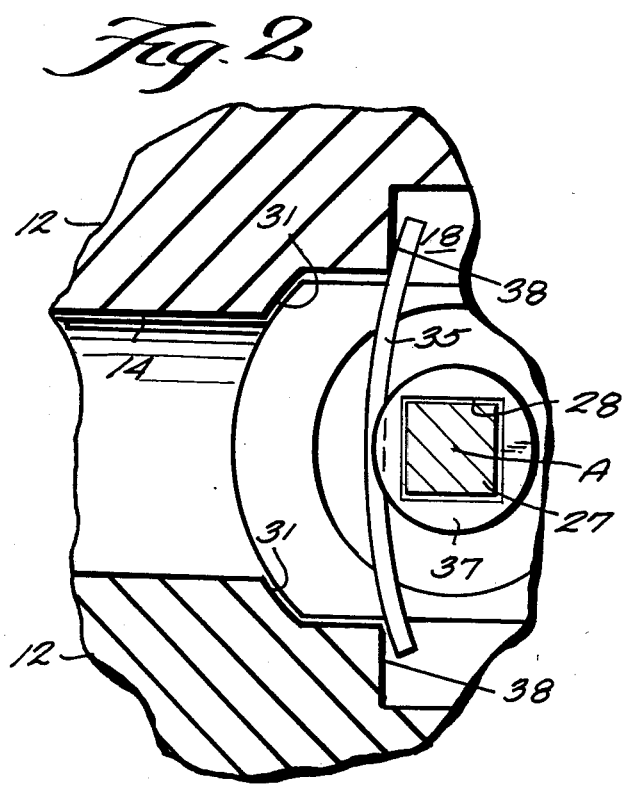
FIG. 2 is a top detail view, partly in cross-section, showing the operative relationship between an elongated spring element and the rotatable valve element and valve body of the valve of FIG. 1.

In FIGS. 1 and 2, the spring elements 35 are shown as having a generally circular crosssection, however the cross-section thereof maybe any desired configuration, such as the quadrate crosssection illustrated for the spring element 40 of FIG. 4. Also, the biasing means may have the configuration illustrated in FIG. 3 wherein an elongated flexible spring element 41 has a bearing member 42 mounted at a central portion thereof. The element 41 is selected of a metal that has desireable spring properties so that it can flex to the dotted line position illustrated in FIG. 3, and provide good biasing action, while the bearing element 42, which is affixed to the element 41, is selected for its good bearing properties. Note that the element 42 preferably has an arcuate shaped portion 43 thereof which is adapted to operatively engage a portion of the ball 20 (as at a trunion portion thereof).

Another exemplary embodiment of a valve according to the present invention is shown generally by reference numeral 110 in FIGS. 5 and 6. In the FIGS. 5 through 7 embodiment the structures corresponding to those in the FIGS. 1 and 2 embodiment are illustrated by the same reference numeral only preceded by a "1".

The valve 110 includes a valve body 111 having a main portion 112 and an end cap 113, with means defining a bore 114 therein including a first end 115 and a second end 116 with an interior cavity 118 therebetween. The rotatable valve element 120 includes a through extending passage way 121 and has trunions 137 at either end thereof, and a shaft 123 extending outwardly through the top of the body 111 for rotating the element 120 about axis A-A. A seal 125 surrounds the shaft 123, and a cap 126 is provided.

Figure 7:
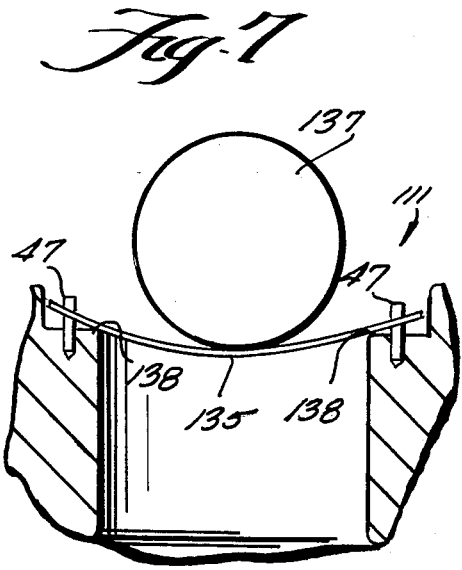
FIG. 7 is a detailed view of a biasing element of the valve of FIGS. 5 and 6 in cooperation with the valve element and valve body.

In the embodiment of FIGS. 5 through 7, the sealing means comprises a separate metal sealing ring 130 which can be removed from the valve body 11, and sits in an annular channel 45 formed therein. The valve element 120 is biased into engagement with the sealing ring 130 by the bar springs 135, which engage the trunions 137 at central portions of the bars springs 135. The bars springs 135 are of metal, and are quadrate in cross section.

The manner in which each bar spring 135 operatively engages the valve element 120 and the valve body 111 is best seen in FIGS. 6 and 7. Note that a central portion of the bar spring 135 makes contact with the trunion 137 while the ends of the bar springs 135 are in operative engagement with valve body 111. Note in particular that pins 47 extend outwardly from the body 111, one pin 47 being adjacent each end of each bar spring 135, and that an elongated opening 48 (see FIG. 6) is provided at each end of the bar spring 135 so that a lost motion connection is provided between each pin 47 and the bars spring 135, through elongated opening 48. As also illustrated in FIG. 7, the bars spring 135 makes tangantial line contact with a shelf portion 138 of the valve body 111 adjacent each pin 47.

It will thus be seen that according to the present invention a simple yet effective metal seated ball valve is provided. Because of the biasing provided by the bars springs to urge the metal valve element into contact with the metal sealing means (metal seat) while an interior cavity is provided having clearance between the valve body and valve element at other portions thereof, if there is differential thermal expansion of the components of the valve jamming will not occur. The particular biasing means according to the invention are inexpensive, simple and easy to install and to replace if necessary, and provide very effective biasing action.

While the invention has been herein shown and described in what is presently conceived to be the most practical and preferred embodiment thereof, it will be apparent to those of ordinary skill in the art that many modifications may be made thereof within the scope of the invention, which scope is to be accorded to broadest interpretation of the appended claim so as to encompass all equivalent structures and devices.

What is claimed is:

1. A valve comprising:
    a valve body including means defining a through-extending bore, including first and second openings at opposite ends thereof and a cavity in a central portion thereof;
    a rotatable valve element having a through-extending passageway therein and mounted for rotation about an axis, within said cavity, for movement between a first, open position wherein said passageway and said bore are generally aligned, to a second, closed, position wherein said passageway and said bore are not aligned;
    metal sealing means mounted by said body adjacent said first end of said body, sealingly engaging said valve element and preventing flow of fluid through said bore first end when said valve element is in said second, closed position; and
    means for biasing said valve element into sealing relationship with said sealing means, said biasing means comprising a pair of elongated, flexible linear spring elements spaced from each other along said axis of rotation and operatively engaging said valve element adjacent said axis of rotation, and each operatively engaging said valve body at positions spaced from said axis of rotation, said valve further comprising a plurality of pins extending from said valve body, one pin associated with an end of each of said elongated spring elements, a lost motion connection being provided between each pin and the end of a spring element with which it cooperates.

2. A valve as recited in claim 1 wherein each of said elements also engages said valve body by making line contact with a shelf portion of said valve body adjacent each of said pins.

* * * * *